(12) United States Patent
Schadler

(10) Patent No.: US 10,882,452 B2
(45) Date of Patent: Jan. 5, 2021

(54) FOLDING DEVICE FOR AN EXTERIOR MIRROR

(71) Applicant: MAGNA Auteca GmbH, Weiz (AT)

(72) Inventor: Bernhard Schadler, Oberrettenbach (AT)

(73) Assignee: MAGNA Auteca GmbH, Weiz (AT)

( * ) Notice: Subject to any disclaimer, the term of this patent is extended or adjusted under 35 U.S.C. 154(b) by 49 days.

(21) Appl. No.: 15/431,500

(22) Filed: Feb. 13, 2017

(65) Prior Publication Data

US 2017/0232901 A1 Aug. 17, 2017

(30) Foreign Application Priority Data

Feb. 16, 2016 (EP) .................................. 16155866

(51) Int. Cl.
*B60R 1/074* (2006.01)
*B60R 1/076* (2006.01)

(52) U.S. Cl.
CPC .............. *B60R 1/074* (2013.01); *B60R 1/076* (2013.01)

(58) Field of Classification Search
CPC ......... B60R 1/074; B60R 1/076; B60R 1/025; B60R 1/02; B60R 1/07; B60R 1/064; B60R 1/06; B60R 1/0617; B60N 2/0248; B60N 2/0244; B60N 2/0232
USPC ........................................................ 359/841
See application file for complete search history.

(56) References Cited

U.S. PATENT DOCUMENTS 3,554,582 A * 1/1971 Yamashita ................ B60R 1/04
248/900
5,636,071 A * 6/1997 Mochizuki .............. B60R 1/074
248/476
6,742,756 B1 * 6/2004 Fimeri .................... B60R 1/074
248/478
6,866,392 B2 * 3/2005 Hayashi .................. B60R 1/074
248/476

(Continued)

FOREIGN PATENT DOCUMENTS

DE 10042678 A1 4/2002
DE 102006021249 B3 10/2007

(Continued)

OTHER PUBLICATIONS

Notice of Reasons for Rejection for Japanese Patent Application No. 2017-023714, dated Apr. 10, 2018, 7 pages including 3 pages of English translation.

*Primary Examiner* — Stephone B Allen
*Assistant Examiner* — Rahman Abdur
(74) *Attorney, Agent, or Firm* — Jordan IP Law, LLC; Todd A. Vaughn

(57) ABSTRACT

A folding device to move a mirror head relative to a mirror base of a motor vehicle exterior mirror, the folding device including a carrier operatively connected to one of the mirror head or the mirror base, a motor arranged in the carrier, and which has a motor shaft, an output device operatively connected to one of the mirror base or the mirror head, and a gear mechanism to operatively connect the output device to the motor shaft. The motor shaft and the output device are located parallel with each other, and the motor, the output device, and the gear mechanism are positioned relative to each other via the carrier, such that the axial spacings of the motor shaft, the output device, and the gear mechanism located therebetween are determined via the carrier.

19 Claims, 4 Drawing Sheets

(56) References Cited

U.S. PATENT DOCUMENTS

2007/0285812 A1* 12/2007 Foote ................... B60R 1/072
359/877
2012/0087026 A1* 4/2012 Schuurmans .......... B60R 1/074
359/841

FOREIGN PATENT DOCUMENTS

WO 2015/008235 A 1/2015
WO 2015/173090 A1 11/2015

* cited by examiner

FOLDING DEVICE FOR AN EXTERIOR MIRROR

CROSS-REFERENCE TO RELATED APPLICATIONS

The present application claims priority 35 U.S.C. § 119 to European Patent Publication No. EP16155866.3 (filed on Feb. 16, 2016), which is hereby incorporated by reference in its complete entirety.

TECHNICAL FIELD

Embodiments relate to a folding device for an external mirror of a motor vehicle, and an external mirror of a motor vehicle having such a folding device.

BACKGROUND

Folding devices are used in external mirrors of motor vehicles, in which the external mirror may be displaced via the folding device, in particular, using an electrical drive of the folding device, between a travel position (folded out) and a parking position (folded in).

The drive of such a folding device generally comprises an electric motor having a motor shaft which, for example, via a worm gear mechanism can initiate a folding movement between the drive and an output of the worm gear mechanism. In this instance, a worm gear may be securely pressed onto the motor shaft (motor worm gear). The rotation of the motor shaft can be transmitted via an intermediate shaft to an output gear which is, however, connected during normal operation to a mirror base in a rotationally secure manner so that there can be produced a folding movement in which the motor or the intermediate shaft together with the motor turns around the upright output.

In folding devices of this type, it is conventional for the motor together with the motor shaft to be retained and positioned between a first housing portion and a second housing portion, in particular between a carrier and a cover. It is also conventional for the intermediate shaft to be supported and positioned via an additional housing component and/or for the output gear to be supported and positioned at the mirror base.

For example, JP 2004 082953 A discloses a folding device in which the motor and intermediate shaft are positioned via an intermediate housing, but an output gear is positioned via a rotation shaft which is mounted at the mirror base.

DE 100 42 678 A1 discloses a folding device, wherein a motor is supported and positioned in a housing portion but the output gear is supported and positioned in a separate housing closure portion.

In the solution of WO 2015 173 090 A1, the motor is positioned both by a carrier housing and by a cover and the output gear is positioned indirectly via a locking disc.

In the known solutions, the axial spacings are each determined via a plurality of separate components. If these components are displaced during assembly, this is reflected in deviations of the axial spacings, which in turn leads to increased occurrence of noise and wear.

SUMMARY

Embodiments relate to a folding device for an external mirror, and an external mirror comprising such a folding device, wherein the folding device has a small spatial requirement so as to cause minimal noise and exhibit minimal wear.

In accordance with embodiments, a folding device for an external mirror of a motor vehicle having a mirror base and a mirror head, wherein via the folding device the mirror head may be folded in and/or folded out relative to the mirror base, the folding device comprising: a carrier to be connected to one of the elements of the mirror head or the mirror base; a motor which is secured to the carrier and which has a motor shaft; an output to be connected to the other of the elements of the mirror base or the mirror head; a gear mechanism to connect the output to the motor shaft, wherein the motor shaft and an axle of the output are located parallel with each other, and the motor, the output, and the gear mechanism are positioned relative to each other via a single component (the carrier), so that the axial spacings of the motor shaft, the axle of the output, and the axles of the gear elements which are located therebetween are determined via the single component (the carrier).

In accordance with embodiments, a folding device to move a mirror head relative to a mirror base of a motor vehicle exterior mirror, the folding device comprising: a carrier operatively connected to one of the mirror head or the mirror base; a motor arranged in the carrier, and which has a motor shaft; an output device operatively connected to one of the mirror base or the mirror head; and a gear mechanism to operatively connect the output device to the motor shaft, wherein the motor shaft and the output device are located parallel with each other, and the motor, the output device, and the gear mechanism are positioned relative to each other via the carrier, such that the axial spacings of the motor shaft, the output device, and the gear mechanism located therebetween are determined via the carrier.

In accordance with embodiments, an external mirror of a motor vehicle, the external mirror comprising: a mirror base; a mirror head; and a folding device to move the mirror head relative to the mirror base, the folding device including a carrier operatively connected to one of the mirror head or the mirror base; a motor arranged in the carrier, and which has a motor shaft; an output device operatively connected to one of the mirror base or the mirror head; and a gear mechanism to operatively connect the output device to the motor shaft, wherein the motor shaft and the output device are located parallel with each other, and the motor, the output device, and the gear mechanism are positioned relative to each other via the carrier, such that the axial spacings of the motor shaft, the output device, and the gear mechanism located therebetween are determined via the carrier.

According to the invention, a folding device is set out, wherein the motor shaft and the axle of the output are located parallel with each other in order to enable a small construction. The motor may in this instance preferably be constructed to be upright. All the axles which are required for the operation of the folding device are positioned via a common component and in particular supported directly in or on this component, that is to say, a carrier, so that the axial spacings are determined by the single component. The carrier is preferably a housing portion of the folding device. As a result of the common bearing, displacements between components which determine axle positions are prevented and consequently the noise and wear which are brought about thereby are also prevented.

In accordance with embodiments, the gear mechanism comprises at least one intermediate shaft. The position of the intermediate shaft is then determined via the carrier.

In accordance with embodiments, the gear mechanism of the folding device comprises at least a first worm gear, preferably additionally a second worm gear, wherein the first worm gear is fitted to the motor shaft and the preferred second worm gear is fitted to the intermediate shaft. The first worm gear may drive a worm gear wheel of the intermediate shaft. The second worm gear, on the intermediate shaft, may mesh with a fixed additional worm gear wheel which acts as an output gear. During a folding movement, the motor or preferably the intermediate shaft including the motor may turn around the upright output.

In accordance with embodiments, the worm gears may, for example, be constructed as involute helicoid worm gears. The worm gear wheels may be constructed as spur gears, in particular obliquely toothed spur gears. Involute helicoid worm gears have the advantage that the tooth arrangement behaves in the same manner with respect to axial displacements so that the direct axial spacing alone is decisive for the engagement.

In accordance with embodiments, the motor shaft may be axially supported directly on the carrier in the direction towards the motor.

In accordance with embodiments, a pressure piece is fixed to the carrier in such a manner that the pressure piece presses the motor shaft against the motor.

In accordance with embodiments, a pressure piece is provided to apply an optimised pressure to the motor shaft in order to achieve an optimum axial play of the motor shaft and thereby to reduce occurrences of noise during a load change.

In accordance with embodiments, the pressure piece is arranged, in particular clamped, between the motor shaft and a housing portion, in particular the carrier or a cover.

In accordance with embodiments, the pressure piece is adjustable via an adjustment screw substantially axially with respect to the motor shaft, wherein the adjustment screw in a particularly preferred manner is in engagement with a thread in the carrier. The substantially axial adjustment of the pressure piece with respect to the motor shaft can also be achieved if the pressure piece in addition to an axial component of the movement also has a component in a non-axial direction, for example, in the event of a pivot movement or tilting movement of the pressure piece via a pivot axle which is spaced apart from the motor shaft axle. Via a threaded self-locking action of the adjustment screw on the carrier, the pressure piece can be fixed in position after adjustment of the desired axial play.

In accordance with embodiments, the pressure piece is suspended so as to be able to be tilted in the carrier at least at a securing location, preferably on a securing axle, wherein the securing location or the securing axle is located at a side of the motor shaft or the motor shaft axle opposite the adjustment screw. As a result of the threaded self-locking action of the adjustment screw, undesirable tilting or pivoting of the pressure piece is prevented.

In accordance with embodiments, in order to maintain a specific axial play, the pressure piece may also be welded to the carrier, in particular when an adjustment screw which remains permanently on the folding device is not used.

In accordance with embodiments, an external mirror of a motor vehicle comprises a mirror base; a mirror head and a folding device, wherein the carrier of the folding device is connected to the mirror head or the mirror base, wherein the output of the folding device is connected to the other of the mirror base or the mirror head, so that via the folding device the mirror head can be folded in and/or folded out relative to the mirror base.

In accordance with embodiments, when an adjustment screw which permanently remains on the folding device is used, no additional securing measures are required and the pressure piece is fixed in position via the threaded self-locking action of the adjustment screw, otherwise the pressure piece may also be welded to the carrier.

In accordance with embodiments, the carrier may be pretensioned via an pressure spring with respect to the element mirror base or mirror head which can be connected to the output or a locking disc which is rotationally secure therewith. The pressure spring may be part of a safety device which permits torsion between the mirror head and mirror base with great external application of force. The pressure spring may be arranged outside the folding drive or also integrated in the folding drive.

DRAWINGS

Embodiments will be illustrated by way of example in the drawings and explained in the description below.

DESCRIPTION

Figure 1:
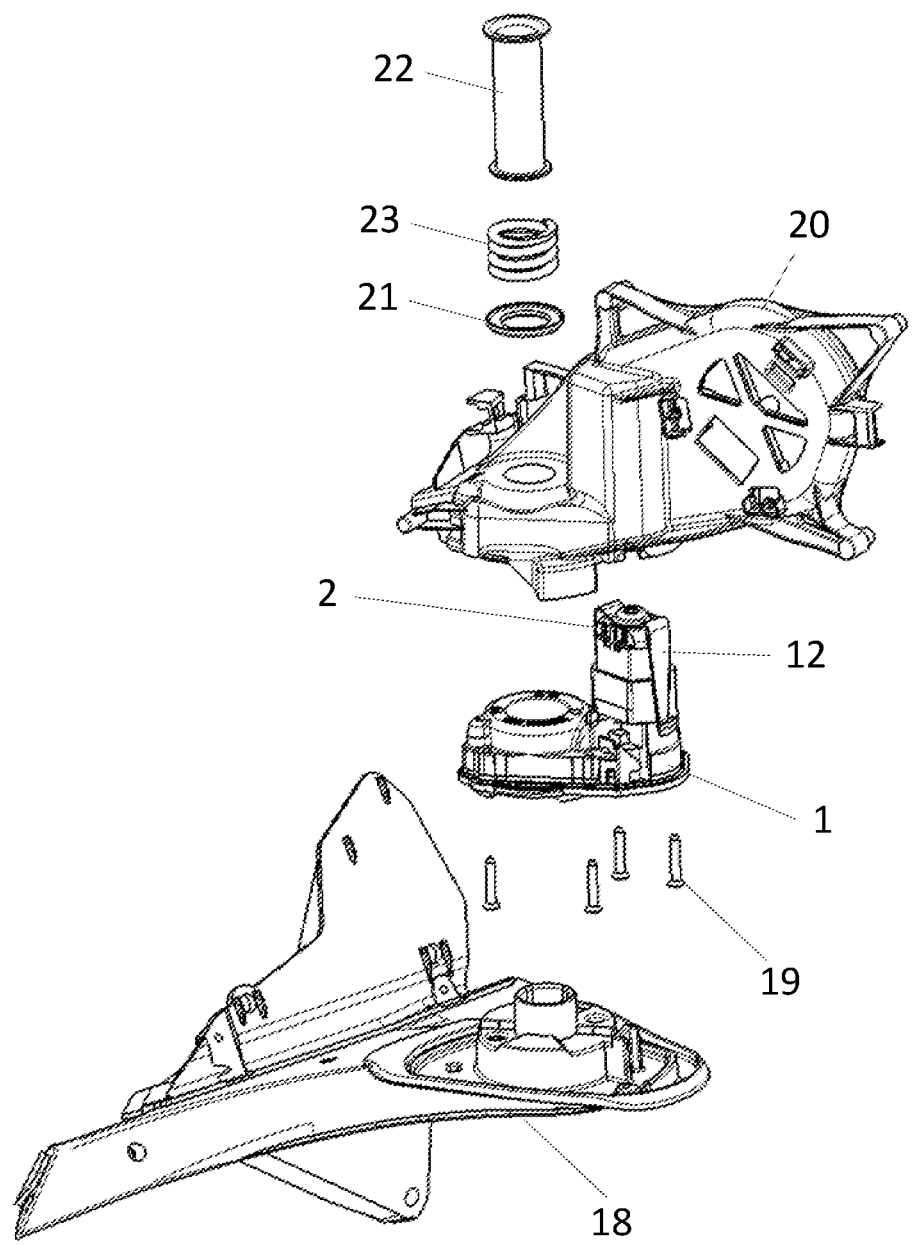
FIG. 1 illustrates a three-dimensional exploded illustration of a folding device with a mirror base and supporting portion of a mirror head, in accordance with embodiments.

FIG. 1 illustrates an exploded view of a folding device with the surrounding components in an external mirror, in accordance with embodiments. Of a mirror head of the external mirror, only the supporting portion of the mirror head 20 is illustrated. Between this supporting portion of the mirror head 20 and the mirror base 18, there is arranged a folding device, of which in FIG. 1 the carrier 1 and the motor 2 which is supported in the carrier 1 via a motor clamping bracket 12 is illustrated.

The folding device may be screwed into the mirror head 20 via, for example, screws 19. In addition, the supporting portion of the mirror head 20 may be pressed via a tubular rivet 22 and a powerful pressure spring 23 which acts on or otherwise engages a sliding disc 21 against the mirror base 18. The pressure spring 23 may, for example, apply a force of approximately 650 N. The pressure spring 23 is part of a safety coupling which permits torsion between the mirror head 20 and the mirror base 18 in the event of excess external application of force to the mirror head 20. The pressure spring 23 may also be integrated in the folding drive itself, in particular, inside the carrier 1. The external construction of the pressure spring 23, as illustrated in FIG. 1 has the advantage that, if the securing screws 19 of the folding device become loose, the pressure spring 23 continues to press the mirror head against the folding device and the mirror base 18.

Figure 2:
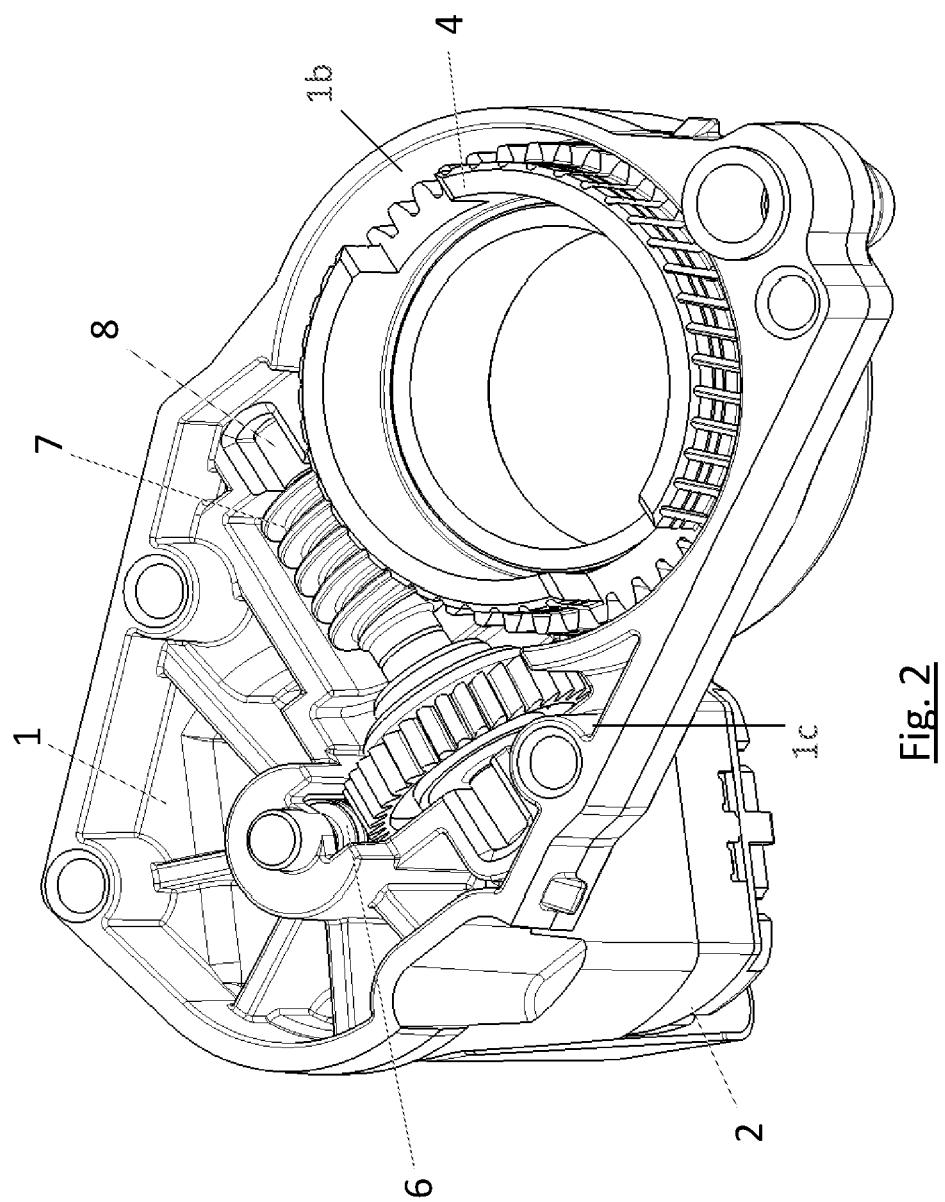
FIG. 2 illustrates a three-dimensional illustration of components which are supported in the carrier of a folding device, in accordance with embodiments.
Figure 3:
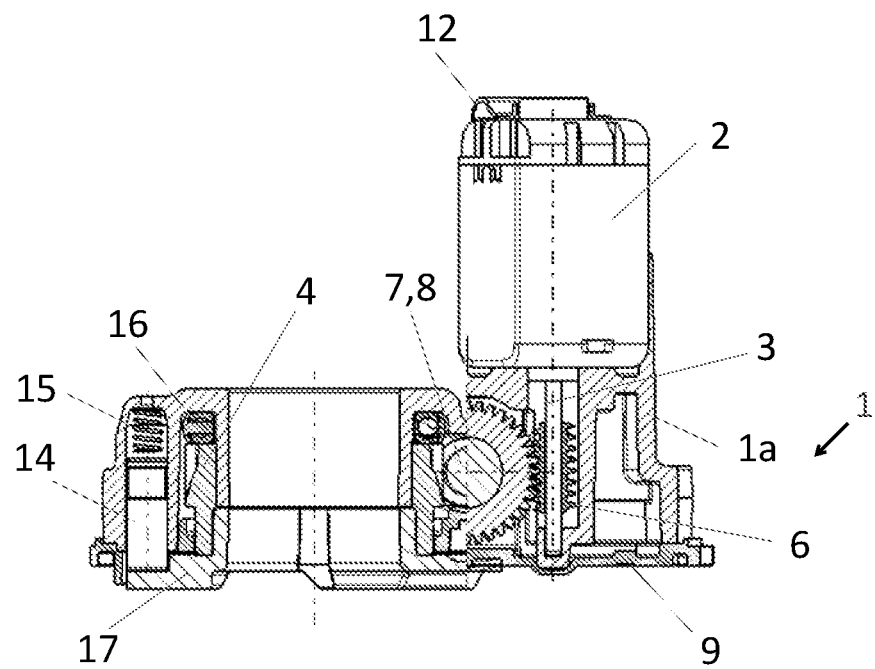
FIG. 3 illustrates a sectioned illustration of the folding device of section A-A of FIG. 4.
Figure 4:
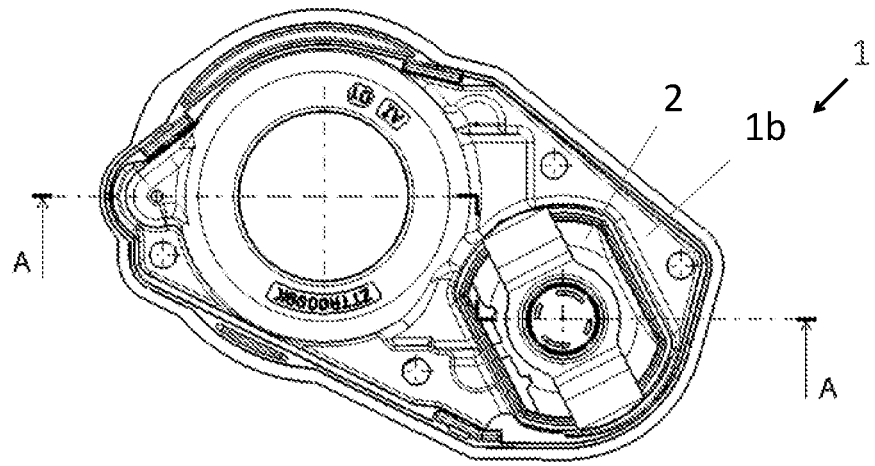
FIG. 4 illustrates a bottom view of a folding device, with the path of the section A-A.

FIGS. 2-4 respectively illustrate a folding device in accordance with embodiments. The folding device comprises the carrier 1 operatively connected to the mirror head 20, and a motor 2 which is secured to a first area 1a at an upper region of the carrier 1, and which has a motor shaft 3. The folding device further comprises an output gear 4, located at a second area 1a at a bottom region of the carrier 1 and operatively connected to the mirror base 18, the output gear 4 being operatively connected to the motor shaft 3 via a gear mechanism. The motor shaft 3 and an axle of the output gear 4 are parallel with each other. The motor 2, the output gear 4, and the gear mechanism comprising an intermediate shaft 8 located at a third area 1c at the bottom region of the carrier 1, are positioned relative to each other via a single component, e.g., the carrier 1, so that the axial spacings of the motor shaft 3, the axle of the output 4, and the axle of the intermediate shaft 8 which is located therebetween are determined by the carrier 1. As illustrated in FIG. 2, the components mentioned are supported directly in the carrier 1.

FIG. 3 is a sectioned illustration of the bearing of the motor 2 and output gear 4 in the carrier 1. The output gear 4 is connected to the locking disc 17 in a positive-locking manner. Together with the pressure spring 23 which is provided in the mirror assembly, the locking contour forms on the lower side of the locking disc 17 with the mirror base 18 a rotationally secure connection which can be overcome in the event of an overload. The locking pin 14 which is loaded with a locking pin pressure spring 15 predetermines the travel position together with a contour at the upper side of the locking disc 17. The locking pin pressure spring 15 is a weak spring with a force of, for example, approximately 10 N.

The gear mechanism between the motor 2 and the output gear 4 is constructed as a two-stage worm gear mechanism, wherein, in the event of a folding movement, the intermediate shaft 8 turns around the upright output gear 4. The intermediate shaft 8 has a worm gear of steel, that is to say, the second worm gear 7, which is in engagement with the output gear 4 and has an injection-moulded spur gear of plastics material. This spur gear is driven via the first worm gear 6, that is to say, the motor worm gear, wherein the motor worm gear is securely pressed onto the motor shaft 3. The axial forces which act on the motor worm gear 6 are absorbed internally in the motor 2 in one direction, in the other direction according to FIG. 3 the carrier 1 supports the motor shaft end.

Figure 5:
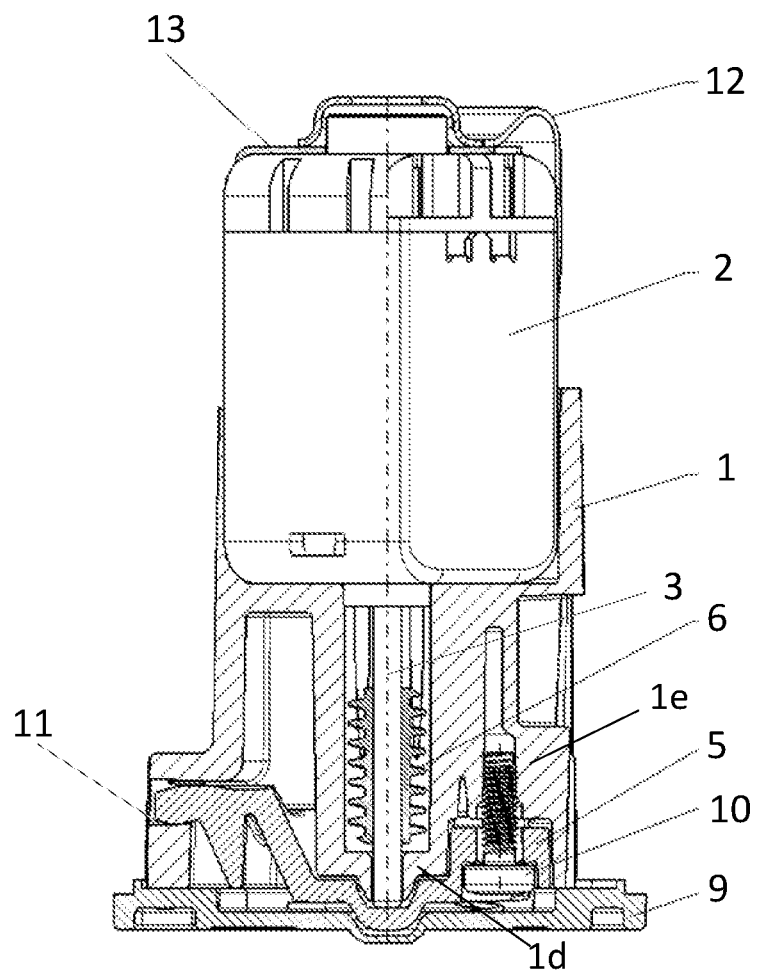
FIG. 5 illustrates a partially sectioned view of a folding device, in accordance with embodiments.

As illustrated in FIG. 5, a pressure piece or device 5 which is fixed in a fourth area 1d at the bottom region of the carrier 1 supports the motor shaft end axially in the direction towards the motor 2. The motor shaft 3 is thereby radially directly positioned by the carrier 1 and axially indirectly via the elements pressure piece 5 and motor 2 which are fixed in the carrier 1. The pressure piece 5 is arranged between the motor shaft 3 and the cover 9. FIG. 5 is a cross-section through the pressure piece 5 and an adjustment screw 10 located at a fifth area 1e at the bottom region of the carrier 1. The electric motor 2 is securely clamped in the carrier 1 via the motor clamping bracket 12, wherein the motor shaft 3 in the front region is guided radially in the carrier 1, but protrudes axially therefrom and is in contact with the pressure piece 5. The pressure piece 5 is in this instance suspended in a slot in the carrier 1 so that the pressure piece 5 is positioned with a securing location 11 or a securing axle on the carrier 1. The pressure piece 5 can be adjusted in the direction towards the carrier 1 via the adjustment screw 10 which is opposite the securing location 11 with respect to the motor shaft 3 so that the motor shaft 3 is arranged between the securing location 11 and adjustment screw 10, and presses in this instance on the motor shaft 3.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Carrier
1a First region (carrier)
1b Second region (carrier)
1c Third region (carrier)
1d Fourth region (carrier)
1e Fifth region (carrier)
2 Motor
3 Motor shaft
4 Output
5 Pressure piece
6 First worm gear
7 Second worm gear
8 Intermediate shaft
9 Cover
10 Adjustment screw
11 Securing location
12 Motor clamping bracket
13 Insulation cap
14 Locking pin
15 Locking pin pressure spring
16 Axial ball bearing
17 Locking disc
18 Mirror base
19 Screws
20 Supporting portion of the mirror head
21 Sliding disc
22 Tubular rivet
23 Pressure spring

What is claimed is:

1. A folding device to move a mirror head relative to a mirror base of a motor vehicle exterior mirror, the folding device comprising:
    a carrier operatively connected to one of the mirror head or the mirror base, the carrier having an upper region, an opposite bottom region, and a securing axle defining a pivot axis, the carrier defining therein:
        a first carrier area, at the upper region, to receive and directly support a motor having a motor shaft protruding axially through and directly radially positioned by the carrier;
        a second carrier area, at the bottom region, to receive and directly support an output device operatively connected to one of the mirror base or the mirror head, the output device being located in parallel with the motor shaft;

a third carrier area, at the bottom region, to receive and directly support a gear mechanism to operatively connect the output device to the motor shaft, wherein the first carrier area, the second carrier area, and the third carrier area are to position the motor, the output device, and the gear mechanism in a manner that defines axial spacings located therebetween;

a fourth carrier area, at the bottom region to receive a pressure device to support, engage, and press the motor shaft against the motor and thereby axially position the motor shaft, the pressure device being suspended in a slot in the carrier for positioning at the securing axle; and a fifth carrier area, at the bottom region to receive an adjustment device configured for movement to engage with an internal thread of the carrier to pivot the pressure device at the pivot axis and thereby substantially axially adjust the pressure device with respect to the motor shaft, wherein a self-locking action of the adjustment device on the carrier is to fix the pressure piece into position.

2. The folding device of claim 1, wherein the gear mechanism comprises at least one intermediate shaft.

3. The folding device of claim 2, wherein the gear mechanism comprises at least a first worm gear arranged on the motor shaft, second worm gear arranged on the at least one intermediate shaft, and a spur gear arranged on the at least one intermediate shaft and which is to be driven by the first worm gear.

4. The folding device of claim 1, wherein the motor shaft is axially supported directly on the carrier in a direction towards the motor.

5. The folding device of claim 1, wherein the adjustment device comprises an adjustment screw.

6. An external mirror of a motor vehicle, the external mirror comprising:

a mirror base;

a mirror head; and a folding device to move the mirror head relative to the mirror base, the folding device including a carrier operatively connected to one of the mirror head or the mirror base, the carrier having an upper region, an opposite bottom region, and a securing axle defining a pivot axis, the carrier defining therein:

a first carrier area, at the upper region, to receive and directly support a motor having a motor shaft protruding axially through and directly radially positioned by the carrier;

a second carrier area, at the bottom region, to receive and directly support an output device operatively connected to one of the mirror base or the mirror head, the output device being located in parallel with the motor shaft;

a third carrier area, at the bottom region, to receive and directly support a gear mechanism to operatively connect the output device to the motor shaft, wherein the first carrier area, the second carrier area, and the third carrier area are to position the motor, the output device, and the gear mechanism in a manner that defines axial spacings located therebetween a fourth carrier area, at the bottom region to receive a pressure device to support, engage, and press the motor shaft against the motor and thereby axially position the motor shaft, the pressure device being suspended in a slot in the carrier for positioning at the securing axle; and a fifth carrier area, at the bottom region to receive an adjustment device configured for movement to engage with an internal thread of the carrier to pivot the pressure device at the pivot axis and thereby substantially axially adjust the pressure device with respect to the motor shaft, wherein a self-locking action of the adjustment device on the carrier is to fix the pressure piece into position;

a cover at the bottom region of the carrier, wherein the pressure device is arranged in the carrier between the motor shaft and the cover.

7. The external mirror of claim 6, further comprising a pressure spring configured to pretension the carrier with respect to the mirror base or the mirror head.

8. The external mirror of claim 7, further comprising a locking disc which is rotationally secure with the pressure spring.

9. The external mirror of claim 6, wherein the gear mechanism comprises at least one intermediate shaft.

10. The external mirror of claim 9, wherein the gear mechanism comprises at least a first worm gear arranged on the motor shaft, a second worm gear arranged on the at least one intermediate shaft, and a spur gear arranged on the at least one intermediate shaft and which is to be driven by the first worm gear.

11. The external mirror of claim 6, wherein the motor shaft is axially supported directly on the carrier in a direction towards the motor.

12. A motor vehicle external mirror, comprising:

a mirror base;

a mirror head; and a folding device to move the mirror head relative to the mirror base, the folding device including a carrier operatively connected to one of the mirror head or the mirror base, the carrier having an upper region, an opposite bottom region, and a securing axle defining a pivot axis, the carrier defining therein:

a first carrier area, at the upper region, to receive and directly support a motor having a motor shaft protruding axially through and directly radially positioned by longitudinally extending interior walls of the carrier;

a second carrier area, at the bottom region, to receive and directly support an output device operatively connected to one of the mirror base or the mirror head;

a third carrier area, at the bottom region, to receive and directly support a gear mechanism to operatively connect the output device to the motor shaft, the gear mechanism having an intermediate shaft to support a gear which is to engage the output device, wherein the first carrier area, the second carrier area, and the third carrier area are to position the motor, the output device, and the gear mechanism in a manner that defines axial spacings located therebetween;

a fourth carrier area, at the bottom region to receive a pressure device suspended in a slot in the carrier for positioning at the securing axle, axially adjustable with respect to the motor shaft in a direction towards the carrier, to support, engage, and press the motor shaft against the motor and thereby axially position the motor shaft, wherein the motor shaft protrudes axially from the carrier for direct contact with the pressure device; and a fifth carrier area, at the bottom region to receive an adjustment device configured for movement to engage with an internal thread of the carrier to pivot the pressure device at the pivot axis and thereby substantially axially adjust the pressure device with respect to the motor shaft, wherein a self-locking action of the adjustment device on the carrier is to fix the pressure piece into position.

13. The motor vehicle external mirror of claim 12, wherein the gear mechanism comprises at least one intermediate shaft.

14. The motor vehicle external mirror of claim 13, wherein the gear mechanism comprises at least a first worm gear arranged on the motor shaft, a second worm gear arranged on the at least one intermediate shaft, and a spur gear arranged on the at least one intermediate shaft and which is to be driven by the first worm gear.

15. The motor vehicle external mirror of claim 12, wherein the motor shaft is axially supported directly on the carrier in a direction towards the motor.

16. The motor vehicle external mirror of claim 12, wherein the adjustment device comprises an adjustment screw.

17. The motor vehicle external mirror of claim 12, further comprising a sliding disc and a pressure spring configured to pretension the carrier with respect to the mirror base or the mirror head by engaging the sliding disc against the mirror base.

18. The motor vehicle external mirror of claim 17, wherein the pressure spring permits torsion between the mirror head and the mirror base in an event of excess external application of force to the mirror head.

19. The motor vehicle external mirror of claim 17, further comprising a locking disc, operatively connected to the output device in a positive-locking manner.

* * * * *